(12) United States Patent
Höglund et al.

(10) Patent No.: US 12,414,125 B2
(45) Date of Patent: Sep. 9, 2025

(54) CONFIGURABLE STARTING POSITION OF SEARCH SPACE WINDOW FOR UPLINK TRANSMISSION ON PRE-CONFIGURED RESOURCES

(71) Applicant: Telefonaktiebolaget LM Ericsson (publ), Stockholm (SE)

(72) Inventors: Andreas Höglund, Solna (SE); Emre Yavuz, Stockholm (SE); Tuomas Tirronen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 456 days.

(21) Appl. No.: 17/775,142

(22) PCT Filed: Nov. 6, 2020

(86) PCT No.: PCT/IB2020/060477
§ 371 (c)(1),
(2) Date: May 6, 2022

(87) PCT Pub. No.: WO2021/090266
PCT Pub. Date: May 14, 2021

(65) Prior Publication Data
US 2022/0386283 A1    Dec. 1, 2022

Related U.S. Application Data

(60) Provisional application No. 62/932,497, filed on Nov. 7, 2019.

(51) Int. Cl.
*H04W 24/08* (2009.01)
*H04W 72/23* (2023.01)
(52) U.S. Cl.
CPC .................................. *H04W 72/23* (2023.01)

(58) Field of Classification Search
CPC ............. H04W 72/23; H04W 52/0216; H04W 52/0225; H04W 72/1268; H04L 1/1678;
(Continued)

(56) References Cited

U.S. PATENT DOCUMENTS

| 12,127,193 | B2 * | 10/2024 | Kim .................... H04L 1/1854 |
| 2019/0313383 | A1 | 10/2019 | Xiong et al. |
| 2022/0030605 | A1 * | 1/2022 | Hu ..................... H04L 5/0053 |

FOREIGN PATENT DOCUMENTS

| CA | 3109174 A1 * | 2/2020 | ........ H04W 52/0235 |
| CA | 3126402 A1 * | 2/2020 | ............ H04L 5/001 |

(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification, (Release 15)", Technical Specification, 3GPP TS 36.331, V15.2.2, Jun. 2018, 791 pages.
(Continued)

*Primary Examiner* — Phuc H Tran
(74) *Attorney, Agent, or Firm* — Sage Patent Group

(57) ABSTRACT

Embodiments include methods implemented in a wireless device for efficient energy consumption at the wireless device. In one embodiment, a method comprises performing an uplink transmission on pre-configured resources to a network node; and monitoring in a search space (SS) window for an application layer response from a network node downlink transmission based on an offset value indicating a time difference between the SS window and the uplink transmission on the pre-configured resources.

16 Claims, 16 Drawing Sheets

(58) Field of Classification Search
CPC ... H04L 1/1822; H04L 1/1854; H04L 1/1887; H04L 1/1896; H04L 5/0055

See application file for complete search history.

(56) References Cited

FOREIGN PATENT DOCUMENTS

| | | | | | |
|---|---|---|---|---|---|
| CN | 103796315 | A | | 5/2014 | |
| CN | 109309955 | A | | 2/2019 | |
| EP | 3952603 | A2 | * | 2/2022 | ........... H04B 7/0695 |
| WO | 2019020036 | A1 | | 1/2019 | |
| WO | WO-2020226394 | A1 | * | 11/2020 | ............... H04L 1/08 |

OTHER PUBLICATIONS

Ericsson, "General PUR Procedure", 3GPP TSG-RAN WG2 #107, Tdoc R2-1910436, Prague, Czech Republic, Aug. 26-30, 2019, pp. 1-16.

Ericsson, "Revised WID: Additional MTC enhancements for LTE", 3GPP TSG RAN Meeting #81, RP-181878, Gold Coast, Australia, Sep. 10-13, 2018, 4 pages.

Huawei, "WID revision: Additional enhancements for NB-IoT", 3GPP TSG RAN meeting #81, RP-181674, Gold Coast, Australia, Sep. 10-13, 2018, 4 pages.

International Search Report and Written Opinion, PCT App. No. PCT/IB2020/060477, Feb. 3, 2021, 14 pages.

ZTE Corporation et al., "Further consideration on UL aspects of D-PUR in Idle", 3GPP TSG-RAN2 meeting#105bis, R2-1903485, Xi'an, China, Apr. 8-12, 2019, 11 pages.

WI Rapporteur (Ericsson); "Summary of RRC parameters for L1 configuration for Rel-16 LTE-MTC"; 3GPP TSG RAN WG1 Meting #98bis; R1-1911574; Oct. 14-20, 2019; China; 4 pages.

Office Action mailed Oct. 22, 2024 for Chinese Patent Application 202080084906.X 13 pages (includes English translation).

* cited by examiner

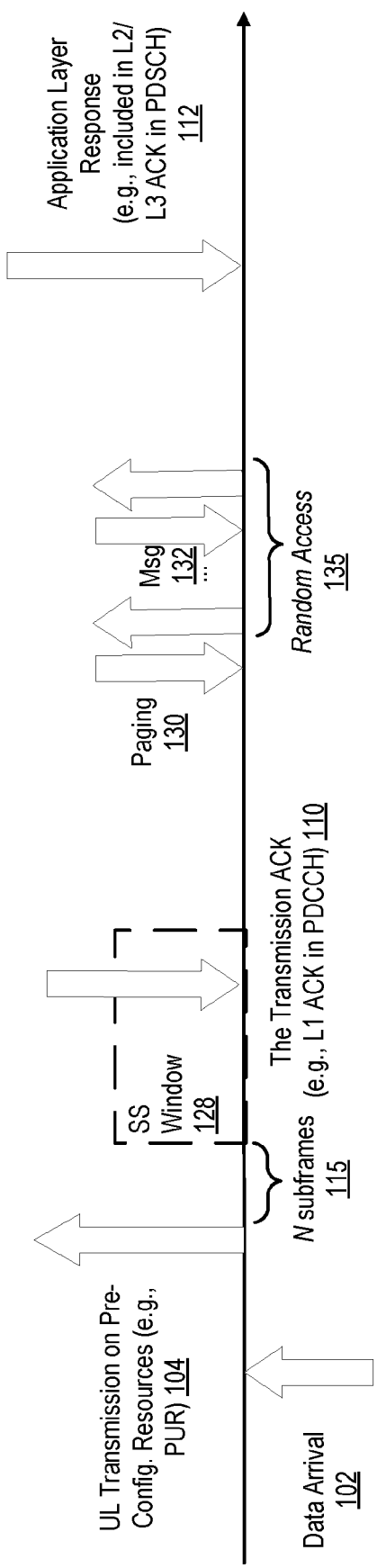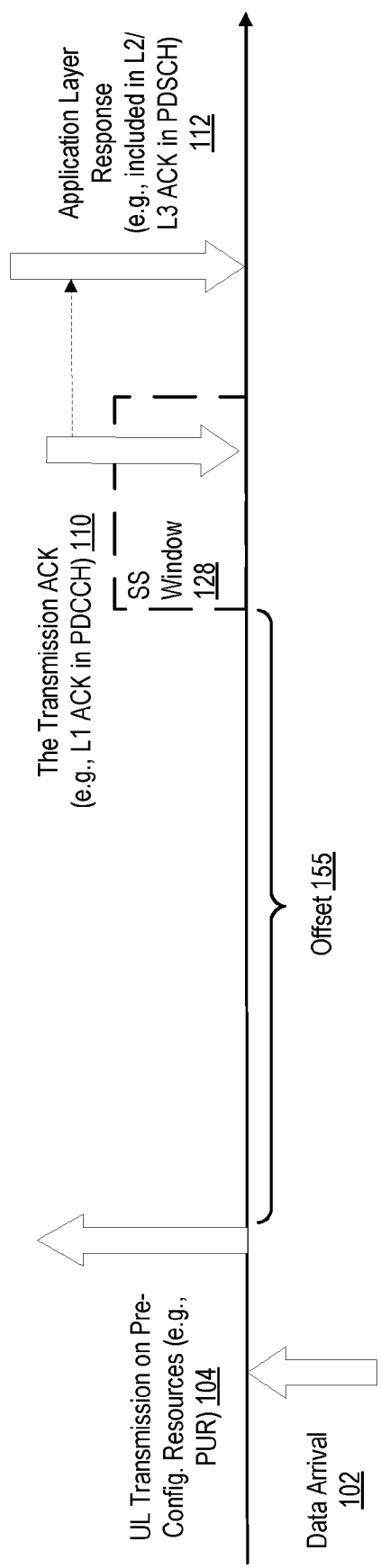

CONFIGURABLE STARTING POSITION OF SEARCH SPACE WINDOW FOR UPLINK TRANSMISSION ON PRE-CONFIGURED RESOURCES

CROSS-REFERENCE TO RELATED APPLICATIONS

This application is a National stage of International Application No. PCT/IB2020/060477, filed Nov. 6, 2020, which claims the benefit of U.S. Provisional Application No. 62/932,497, filed Nov. 7, 2019, which are hereby incorporated by reference.

TECHNICAL FIELD

Embodiments of the invention relate to the field of wireless networking; and more specifically, to the configuration of a starting position of a search space window for uplink transmission on pre-configured resources.

BACKGROUND ART

In a wireless network, Pre-configured Uplink Resources (PUR) introduce the possibility to assign radio resources to a user equipment (UE) in advance for transmission of uplink data without the need of connection setup. The UE saves power from PUR when data transmissions are frequent and observe a periodicity. Yet while the signaling is reduced for the data transmission part, the UE energy consumption from the UE having to monitor a physical downlink control channel (PDCCH) in a search space (SS) window becomes relatively large if the monitoring time is not limited. For example, an application layer response to a PUR transmission may incur a delay in the order of seconds after the PUR transmission. Extending the SS window to monitor the PDCCH corresponding to the application layer response may consume excessive power and drain the battery of the UE.

SUMMARY OF THE INVENTION

Embodiments include methods implemented in a wireless device for efficient energy consumption at the wireless device. In one embodiment, a method comprises performing an uplink transmission on pre-configured resources to a network node; and monitoring in a search space (SS) window for an application layer response from a network node downlink transmission based on an offset value indicating a time difference between the SS window and the uplink transmission on the pre-configured resources.

Embodiments include methods implemented in a network node for efficient energy consumption at a wireless device coupled to the network node. In one embodiment, a method comprises transmitting to the wireless device an offset value indicating a time difference between an uplink transmission on pre-configured resources and a search space (SS) window; receiving the uplink transmission from the wireless device; and transmitting an application layer response from the network node to the wireless device responsive to the uplink transmission.

Embodiments include wireless devices for efficient energy consumption. In one embodiment, a wireless device comprises processing circuitry and a device readable medium coupled to the processing circuitry, wherein the device readable medium stores instructions, which when executed, are capable of causing the wireless device to perform operations of: performing an uplink transmission on pre-configured resources to a network node, and monitoring in a search space (SS) window for an application layer response from a network node downlink transmission based on an offset value indicating a time difference between the SS window and the uplink transmission on the pre-configured resources.

Embodiments include network node for efficient energy consumption on coupled wireless devices. In one embodiment, a network node comprises processing circuitry and a device readable medium coupled to the processing circuitry, wherein the device readable medium stores instructions, which when executed, are capable of causing the wireless device to perform operations of: transmitting to the wireless device an offset value indicating a time difference between an uplink transmission on pre-configured resources and a search space (SS) window; receiving the uplink transmission from the wireless device; and transmitting an application layer response from the network node to the wireless device responsive to the uplink transmission.

Embodiments include device readable media for efficient energy consumption on a wireless device. In one embodiment, a device readable medium stores instructions, which when executed, are capable of causing a wireless device to perform operations, comprising: performing an uplink transmission on pre-configured resources to a network node; and monitoring in a search space (SS) window for an application layer response from a network node downlink transmission based on an offset value indicating a time difference between the SS window and the uplink transmission on the pre-configured resources.

Embodiments include device readable media for efficient energy consumption on a wireless device. In one embodiment, a device readable medium stores instructions, which when executed, are capable of causing a network node to perform operations, comprising: transmitting to the wireless device an offset value indicating a time difference between an uplink transmission on pre-configured resources and a search space (SS) window; receiving the uplink transmission from the wireless device; and transmitting an application layer response from the network node to the wireless device responsive to the uplink transmission.

By implementing a configurable starting position of a search space window, the downlink monitoring after an uplink transmission on pre-configured resources may conserve the energy consumption, and that allows the whole uplink transmission feature to achieve power efficiency at a wireless device.

BRIEF DESCRIPTION OF THE DRAWINGS

The invention may best be understood by referring to the following description and accompanying drawings that are used to illustrate embodiments of the invention. In the drawings:

FIGS. 1A-1C illustrate procedures for uplink transmissions on pre-configured resources and their responses between a wireless device and a base station.

FIG. 2 illustrates a procedure for uplink transmissions on pre-configured resources and their responses between a wireless device and a base station in accordance with some embodiments.

DETAILED DESCRIPTION

Figure 1A:
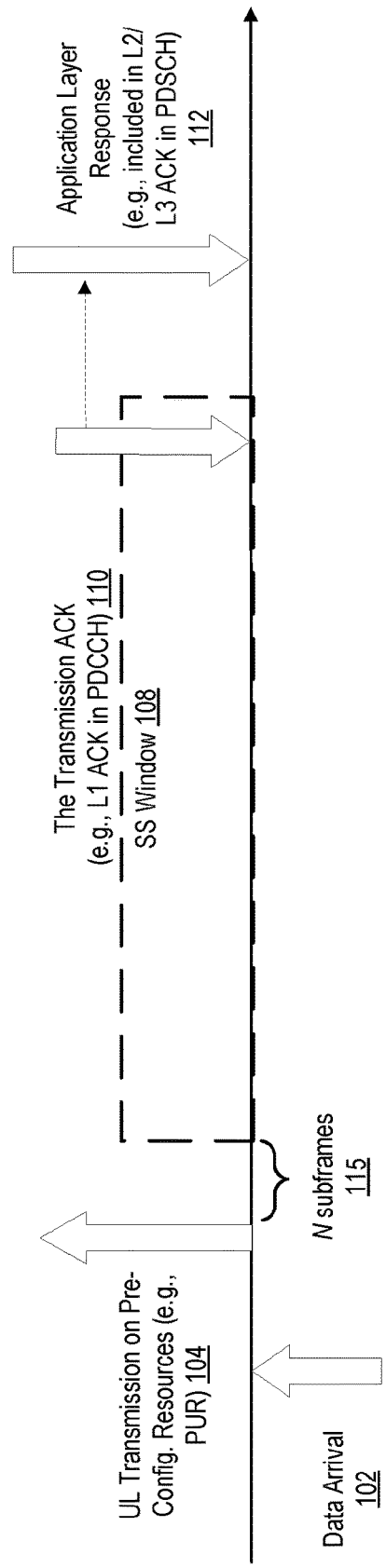

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There has been a lot of work in 3rd Generation Partnership Project (3GPP) on specifying technologies to cover Machine-to-Machine (M2M) and/or Internet of Things (IoT) related use cases. Most recent work for 3GPP Release 13, 14, and 15 includes enhancements to support Machine-Type Communications (MTC) with new UE categories (Cat-M1, Cat-M2), supporting reduced bandwidth of up to 6 and 24 physical resource blocks (PRBs), and Narrowband IoT (NB-IoT) UEs providing a new radio interface (and UE categories Cat-NB1 and Cat-NB2).

In the present disclosure, the long-term evolution (LTE) enhancements introduced in 3GPP Release 13, 14, and 15 for MTC are referred to as enhanced MTC ("eMTC") or "LTE-M", including (not limiting) support for bandwidth limited UEs, Cat-M1, and support for coverage enhancements. This is to separate discussions from Narrowband Internet of Things (NB-IoT), notation used herein for any Release, although the supported features are similar on a general level. Additionally, while the discussion herein uses LTE in examples, the present disclosure applies to wireless technologies such as the fifth generation (5G) new radio (NR).

For both eMTC and NB-IoT, "Cellular Internet of Things (CIoT) Evolved Packet System (EPS) User Plane (UP) optimization" and "CIoT EPS Control Plane (CP) optimization" signaling reductions were also introduced in Rel-13. The former, herein referred to as UP-solution, allows the UE to resume a previously stored radio resource control (RRC) connection (thus also known as RRC Suspend/Resume). The latter, herein referred to as CP-solution, allows the transmission of user-plane data over non-access stratum (NAS) (as known as DoNAS).

There are multiple differences between "legacy" LTE and the procedures and channels defined for eMTC and for NB-IoT. Some important differences include a new physical channel, such as the physical downlink control channels (PDCCHs), called MTC Physical Downlink Control Channel (MPDCCH) in eMTC and Narrow Band Physical Downlink Control Channel (NPDCCH) in NB-IoT, and a new physical random-access channel (NPRACH) for NB-IoT. Another important difference is the coverage level (also known as coverage enhancement level) that these technologies can support. By applying repetitions to the transmitted signals and channels, both eMTC and NB-IoT allow UE operation down to much lower SNR level compared to LTE. For example, Es/Iot may denote a ratio of Es, which is the received energy per resource element (RC) (power normalized to the subcarrier spacing) during the useful part of a symbol (excluding the cyclic prefix), at an antenna connector of a UE, to Iot, which is the received power spectral density of the total noise and interference for a certain RE (power integrated over the RE and normalized to the subcarrier spacing) as measured at the antenna connector of a UE. The ratio Es/Iot can be set to be ≥−15 dB as the lowest operating point for eMTC and NB-IoT which can be compared to −6 dB Es/IoT for "legacy" LTE.

The Rel-16 Work Item Descriptions for LTE-M and NB-IoT contain a common objective on improving the uplink transmission efficiency and/or UE power consumption by means of transmission in pre-configured resources, including the objective of improving UL transmission efficiency and/or UE power consumption. For example, the transmission on pre-configured resources may specify support for transmission in pre-configured resources in idle and/or connected mode based on Single-carrier Frequency-Division Multiple Access (SC-FDMA) waveform for UEs with a valid timing advance, where both shared resources and dedicated resources can be discussed. Note the discussion is limited to orthogonal (multi) access schemes.

Power Conservation in Procedure for Uplink Transmission on Pre-Configured Resources Pre-configured Uplink Resources (PUR) is introduced to reduce signaling overhead and the gain for the UE, thus resulting in reduced energy consumption and hence a longer UE battery life. However, while the signaling is reduced for the data transmission part, the UE energy consumption from the UE having to monitor the (M/N)PDCCH in a PUR Search Space (SS) window can quickly become relatively large if the monitoring time is not limited. A PUR SS window is a time duration in which the UE monitors the downlink transmission for a response to the PUR transmission. One thing that could lead to extended PUR SS window and monitoring time is application layer response, for which delay can be on the order of seconds after the PUR transmission. Several approaches may address the issue. The PUR SS window could be configured long enough for the (M/N)PDCCH to be sent before the end of the window to include information to identify a corresponding application layer response to the PUR transmission. The long PUR SS window consumes UE's battery. Alternatively, the UE could be released to Idle after PUR ACK (L1 or L2/L3) and the UE then monitors for the application layer response at a later time, after the UE is paged. The latter approach requires a paging process plus a random-access procedure (e.g., using a random-access channel (RACH) from the UE. The paging and random-access procedure similarly consumes the UE's battery. Neither of these approaches can provide UE energy consumption as small as that of the PUR transmission part.

Embodiments of the present disclosure may provide solutions to these or other challenges in preserving UE energy used by PUR and other similar operations. While the present disclosure explains the embodiments through PUR herein below, the invention is not so limited and other similar operations may use the embodiments as well. For example, similar operations include the transmission of uplink data on pre-configured resources (e.g., in physical uplink control channel (PUSCH) using a configured grant type (types 1 or 2)).

For example, embodiments include configuring a time offset between a PUR transmission (e.g., from the beginning or end of the PUR transmission) and its corresponding PUR SS window (e.g., to the starting point or another point in the PUR SS window), where the time offset depends on the expected application layer response delay.

In some embodiments, a wireless device (e.g., a UE) may performing pre-configured uplink resources (PUR) transmission and monitoring downlink transmission from a network node (e.g., a base station) for an application layer response based on an offset value between a PUR search space (SS) window and the PUR transmission. The offset value may be between the beginning of the PUR SS window and the beginning or end of the PUR transmission. The offset value may be configured and transmitted by the network node to the wireless device.

For another example, a network node (e.g., a base station) may transmit to a wireless device an offset value between a PUR SS window and a PUR transmission, receive the PUR transmission from the wireless device, and transmit an application layer response responsive to the PUR transmission from the base station to the wireless device. The offset value may be based on a PUR configuration request received from the wireless device.

The benefits of the embodiments include to ensure that the downlink monitoring after an uplink transmission on pre-configured resources does not consume much more energy than the uplink transmission itself, and that allows the whole uplink transmission feature to achieve power efficiency at a wireless device.

In general, a base station such as an evolved NodeB (eNB) (or a next generation NodeB (gNB)) is largely agnostic to higher layer procedures such as operations at the application layer. The application layer may be the top layer in (1) the open systems interconnection (OSI) model, (2) the Internet protocol suite (e.g., the Transmission Control Protocol (TCP) and the Internet Protocol (IP)), or (3) a layer over the layers specified in 3GPP (e.g., the layer processing IP traffic or TCP/UDP traffic). The rationale is that the radio access network (RAN) solution should work with any kind of application, and in this case any kind of application layer response delay. As known in the art, for a wireless network implementing LTE, 5G NR, or later generation techniques, Layer 1 is a physical layer, carrying information from upper layers to transmit over wireless interfaces. It provides link adaptation, power control, cell search and other measurements for the upper layers. Layer 2 includes medium access control (MAC), radio link control (RLC), and packet data convergence protocol (PDCP), and Layer 3 includes radio resource control (RRC), non-access stratum (NAS), and Internet Protocol (IP). The application layer is above Layers 1 to 3.

An uplink transmission on pre-configured resources (e.g., PUR) is configured for periodic traffic, and a sensible network implementation would configure periodic radio resources in RRC IDLE for a very long time for the uplink transmission only if it can really trust that the traffic is truly periodic. For example, to have this kind of data prediction, likely observation of the UE's traffic pattern will be done over some time before it is concluded that the UE indeed follows a predictable pattern such that PUR can be configured. PUR is configured when the UE is in connected mode, and the eNB would then configure the UE with PUR parameters (e.g., transport block size (TBS) and PUR periodicity) that suit the traffic pattern of the UE.

The observed periodicity also means that the application layer response delay can also accurately be predicted. Note that if the periodic uplink reports are due to a certain application (with the same TBS, etc.) using PUR transmission, there is no reason why not also the application layer response and its delay would be the same for every PUR transmission. This means that, as part of the PUR configuration, a configurable offset for the start of the PUR SS window relative to the beginning/end of the PUR transmission can be provided to the UE. Using the configurable offset, the MPDCCH or NPDCCH ((M/N)PDCCH) monitoring time and signaling would then be greatly reduced.

Figure 1B:
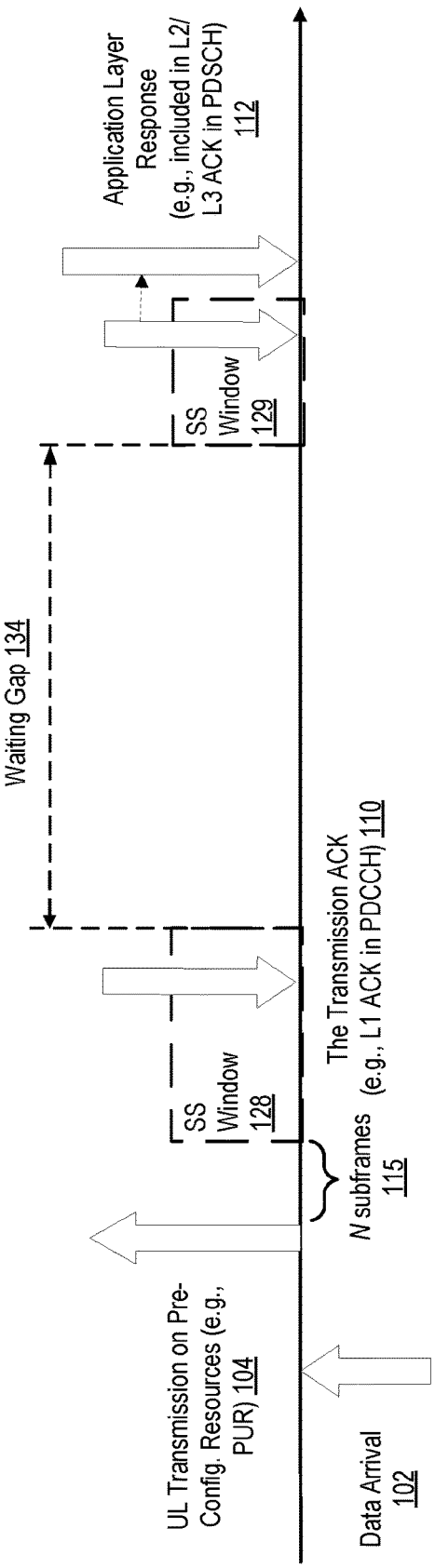

FIGS. 1A-C illustrate procedures for uplink transmissions on pre-configured resources and their responses between a wireless device and a base station. In FIG. 1A, the data arrival at a UE occurs at reference 102, and the UE performs an uplink transmission (e.g., a PUR transmission) to transmit the data to a base station at reference 104. Afterward, the UE waits for a fixed time period (e.g., a number of subframes at reference 115) and then starts to monitor a search space (SS) window at reference 108 for a base station response.

Note that RAN1 has agreed on a fixed timing for the start position of the PUR SS window as quoted Agreement below shows.

Agreement [LTE-M]
 For dedicated PUR in idle mode and for HD-FDD UEs, the start of the PUR SS Window is 4 subframes after the end of the PUR transmission.
 For dedicated PUR in idle mode and for FD-FDD/TDD UEs, the start of the PUR SS Window is 4 subframes after the end of the PUR transmission.
 For future study (FFS) whether/when the UE is monitoring for early termination during the PUR transmission.

After the uplink transmission, when the base station determines that no radio resource control (RRC) response message is needed, the base station may transmit a downlink acknowledgement to the UE to acknowledge the transmission at reference 104. In some embodiments, the acknowledgment is a Layer 1. The acknowledgment concludes the transmission procedure and the UE moves to idle since no response is needed. The Layer 1 acknowledgement may be received in a PDCCH (e.g., MPDCCH or NPDCCH), which is received by the UE during the SS window 108.

Alternatively, the base station may determine that an RRC response message (including an application layer response) is necessary, and the base station may transmit two responses downlink to the UE. The first acknowledgment may be a Layer 1 (or Layer 2/3) acknowledgement. The UE is to receive the acknowledgment during the SS window 108 in a PDCCH, which provides information about where to locate the application layer response. The application layer response is then identified by the UE as shown at reference 112. The application layer response may be provided in a RRC message in a PDSCH (scheduled and indicated by the PDCCH) in some embodiments—e.g., the application layer response is encapsulated (e.g., by NAS in Layer 3) and put inside the RRC message in this case. Additionally or alternatively, the application layer response may be sent together with a Layer 2 or 3 acknowledgement in the RRC message—e.g., the application layer response may be multiplexed in the same transmission block (TB) for the same physical layer transmission of the RRC message.

In other words, while the application layer response is data traffic from whatever applications are being used, the RRC message is control traffic (signaling), and the two types of traffic come from different sources and protocols. In physical layer transmission, various protocol data units (PDUs) are combined/multiplexed, and the application layer response may be embedded within a RRC message (the former case) and/or multiplexed with the RRC message in the same physical layer transmission (the latter case).

Note that for either case, the UE may monitor the MPDCCH/NPDCCH that schedules the PDSCH (MTC PDSCH (MPDSCH) or narrow band PDSCH (NPDSCH), respectively, where the MPDSCH/NPDSCH may include the application layer response.

In this approach, the SS window 108 needs to be long since the application layer response may take a few seconds to be generated and transmitted from the base station to the UE, yet monitoring the long SS window by the UE consumes significant energy. A UE is often mobile and power efficiency is a critical aspect of its operations. The long SS window caused deterioration of power efficiency may make the procedure for uplink transmission on pre-configured resources undesirable.

FIG. 1B shows a second procedure for an uplink transmission on pre-configured resources that are similar to the first procedure in FIG. 1A, but one difference is that the SS window is shortened to SS window 128 as shown to reduce power consumption by the procedure. Instead of a long SS window for the much-delayed application layer response, the SS window 128 is short and the UE monitors in SS window 128 for a transmission acknowledgement that indicates that the transmission is received. A waiting gap 134 is introduced for the UE to stop monitoring for the application layer response during the waiting gap 134. Afterward, the UE monitors another SS window 129 for another transmission acknowledgement (e.g., in a PDCCH), which provides information about where to locate the application layer response at reference 112, similar to the process in FIG. 1A.

The two SS windows 128 and 129 in combination may be shorter than the SS window 108 in FIG. 1A and thus conserves energy consumption during the monitoring for transmission in the PDCCH/PDSCH, yet the two acknowledgments, the first to cause the UE to stop monitoring and the second to provide information for the UE to locate the application layer response, may introduce unnecessary complexity in the procedure for the uplink transmission on pre-configured resources. For example, in addition to the two acknowledgements, the UE needs to know the value of the waiting gap, and the UE may determine the value or obtained from the coupled network node, both adding complexity in the procedure.

FIG. 1C shows a third procedure for uplink transmission on pre-configured resources. The third procedure is similar to the first procedure in FIG. 1A, but one difference is that the procedure is terminated/suspended after the shortened SS window 128, followed by a paging 130 and random access (RA) process 135, after which the application layer response is received. In this approach, the paging and RA process consume UE energy, and may again degrade the UE's power efficiency for the uplink transmission on pre-configured resources.

FIG. 2 illustrate a procedure for uplink transmission on pre-configured resources and their responses between a wireless device and a base station in accordance with some embodiments. The operation in FIG. 2 are similar to the first procedure in FIG. 1A. One difference in FIG. 2 is that the SS window 128 does not start until after an offset period at reference 155. The SS window 128 again is shortened comparing to the SS window 108, and the UE monitors the SS window 128 for information to locate the application layer response (e.g. the Layer 1 acknowledgement, in a PDCCH), and then UE locates the application layer response based on the information and obtains the application layer response (e.g., in a PDSCH corresponding to the PDCCH) in some embodiments. Additionally, the application layer response may be sent together with a Layer 2 or 3 acknowledgement in the RRC message in some embodiments—embedded in and/or multiplexed with the RRC message as explained herein.

The offset period 155 is determined based on the expected application layer response delay. In some embodiment, to get better knowledge of the expected application layer response delay, a desired offset value X could be requested by the UE as part of the "PUR configuration request," which includes assistance information sent to the base station (or another network node) from the UE before the PUR configuration. The offset period may be configured to be aligned with the application layer response delay. For example, the offset period may be equal or slightly larger than the application layer response delay, so that the wireless device starts monitoring the SS window right before the application layer response arrives (the application layer response may experience propagation delay from the network node to the wireless device). In some embodiments, the wireless device may perform discontinuous reception (DRX) for a duration indicated by the offset.

Additionally or alternatively, the UE may determine the offset value on its own without getting the offset value from the base station or network node in some embodiments.

With the configurable offset value, the starting position of the SS window is configurable, and the starting position of the SS window may be set to align with the expected application layer response delay for the UE's traffic. The configurable offset value may be configured as part of PUR configuration per UE, based on its traffic pattern.

Operations in Some Embodiments

Figure 3A:
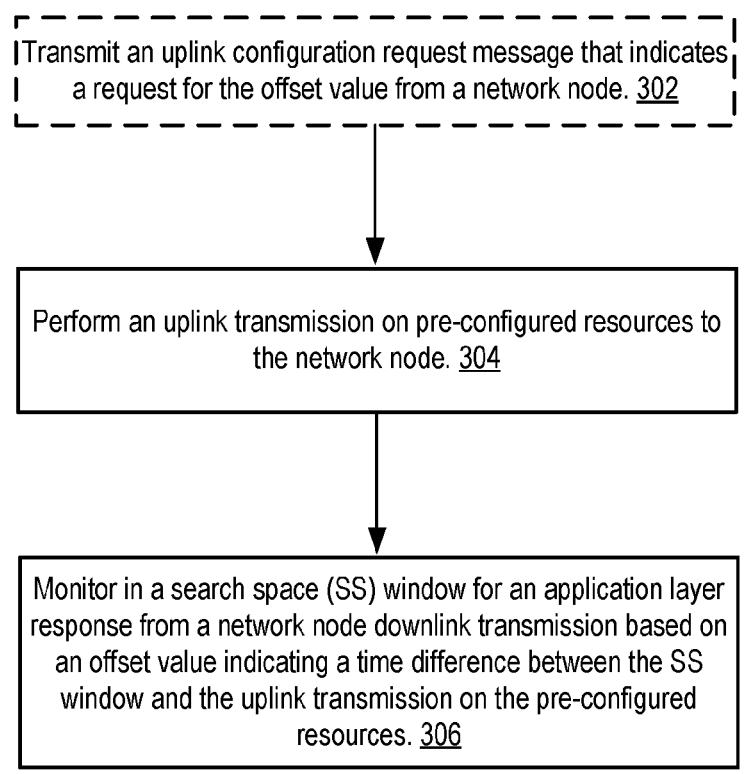
FIG. 3A illustrates a procedure for an uplink transmission on pre-configured resources at a wireless device in accordance with some embodiments.

The operations of procedures for an uplink transmission on pre-configured resources include the ones in both wireless device and network node (e.g., a base station). FIG. 3A illustrates a procedure for an uplink transmission on pre-configured resources at a wireless device in accordance with some embodiments. The wireless device may perform the operations to conserve its energy consumption in the procedure for the uplink transmission on pre-configured resources. The wireless device may be the wireless device 410 and the network node may be the network node 460, discussed in more details herein below. In some embodiments, the uplink transmission on the pre-configured resources comprises a pre-configured uplink resource (PUR) transmission.

At reference 302, a wireless device optionally transmits an uplink configuration request message that indicates a request for an offset value from a network node. Responsively, the network node transmits the offset value in an uplink configuration message to the wireless device.

The offset value is to indicate a duration between (1) a beginning or end of the SS window and (2) the beginning or end of the uplink transmission in some embodiments. Additionally or alternatively, the offset value may be determined by the wireless device. The offset value may be determined based on an expected application layer response delay for the uplink transmission or an observed traffic pattern at the wireless device in some embodiments.

At reference 304, the wireless device performs an uplink transmission on pre-configured resources to the network node. At reference 306, the wireless device monitors in a search space (SS) window for an application layer response from a network node downlink transmission based on the offset value indicating a time difference between the SS window and the uplink transmission on the pre-configured resources.

In some embodiments, the wireless device is to identify a layer 1 acknowledgment of the uplink transmission in the SS window. In some embodiments, the wireless device monitors one of a machine-type communication (MTC) physical downlink control channel (MPDCCH) or a narrow band physical downlink control channel (NPDCCH) for identifying the application layer response. In some embodiments, the wireless device monitors the MPDCCH that schedules a MTC PDSCH (MPDSCH) or the NPDCCH that schedules a narrow band PDSCH (NPDSCH), where the MPDSCH/NPDSCH includes the application layer response. The M/NPDCCH providing information to locate the application layer response is also discussed herein above relating to FIGS. 1A-C and FIG. 2.

In some embodiments, the application layer response is sent together with a RRC message that includes a Layer 2 or Layer 3 acknowledgement in a same physical layer transmission from the network node to the wireless device. In some embodiments, the application layer response is included in the RRC message.

In some embodiments, the wireless device performs discontinuous reception (DRX) for a duration indicated by the offset value.

Figure 3B:
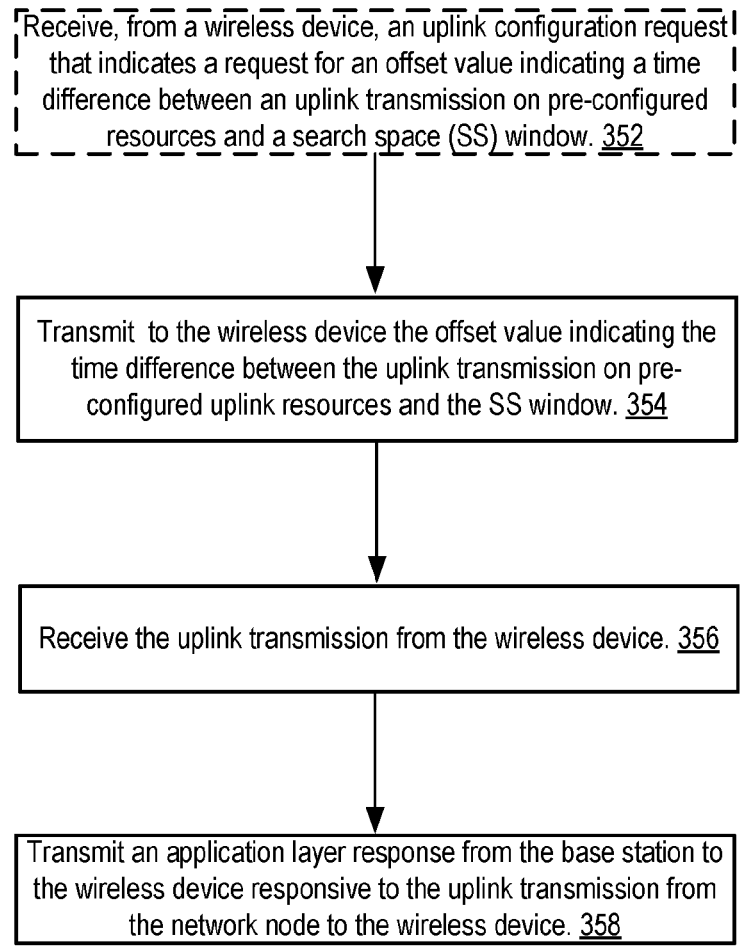
FIG. 3B illustrates a procedure for an uplink transmission on pre-configured resources at a network node in accordance with some embodiments.

FIG. 3B illustrates a procedure for an uplink transmission on pre-configured resources at a network node in accordance with some embodiments. The network node may perform the operations to conserve the energy consumption by a coupled wireless device in the procedure for the uplink transmission on pre-configured resources. In some embodiments, the uplink transmission on the pre-configured resources comprises a pre-configured uplink resource (PUR) transmission.

At reference 352, the network node optionally receives from the wireless device, an uplink configuration request that indicates a request for the offset value indicating a time difference between an uplink transmission on pre-configured resources and a search space (SS) window.

At reference 354, the network node transmits to the wireless device the offset value indicating the time difference between an uplink transmission on pre-configured resources and a search space (SS) window. In some embodiments, the offset value is included in an uplink configuration message to the wireless device.

At reference 356, the network node receives the uplink transmission from the network device, and at reference 358, the network device transmits an application layer response from the network node to the wireless device responsive to the uplink transmission.

In some embodiments, the offset value is determined based on an expected application layer response delay for the uplink transmission or observed traffic pattern at the wireless device. In some embodiments, the network device transmits an acknowledgement to the uplink transmission in the SS window. The acknowledgment comprises a layer 1 acknowledgement, which may be transmitted in a PDCCH as discussed herein. In some embodiments, the application layer response is sent together with a RRC message that includes a Layer 2 or Layer 3 acknowledgement in a same physical layer transmission from the network device to the wireless device. In some embodiments, the application layer response is included in the RRC message.

Figure 4:
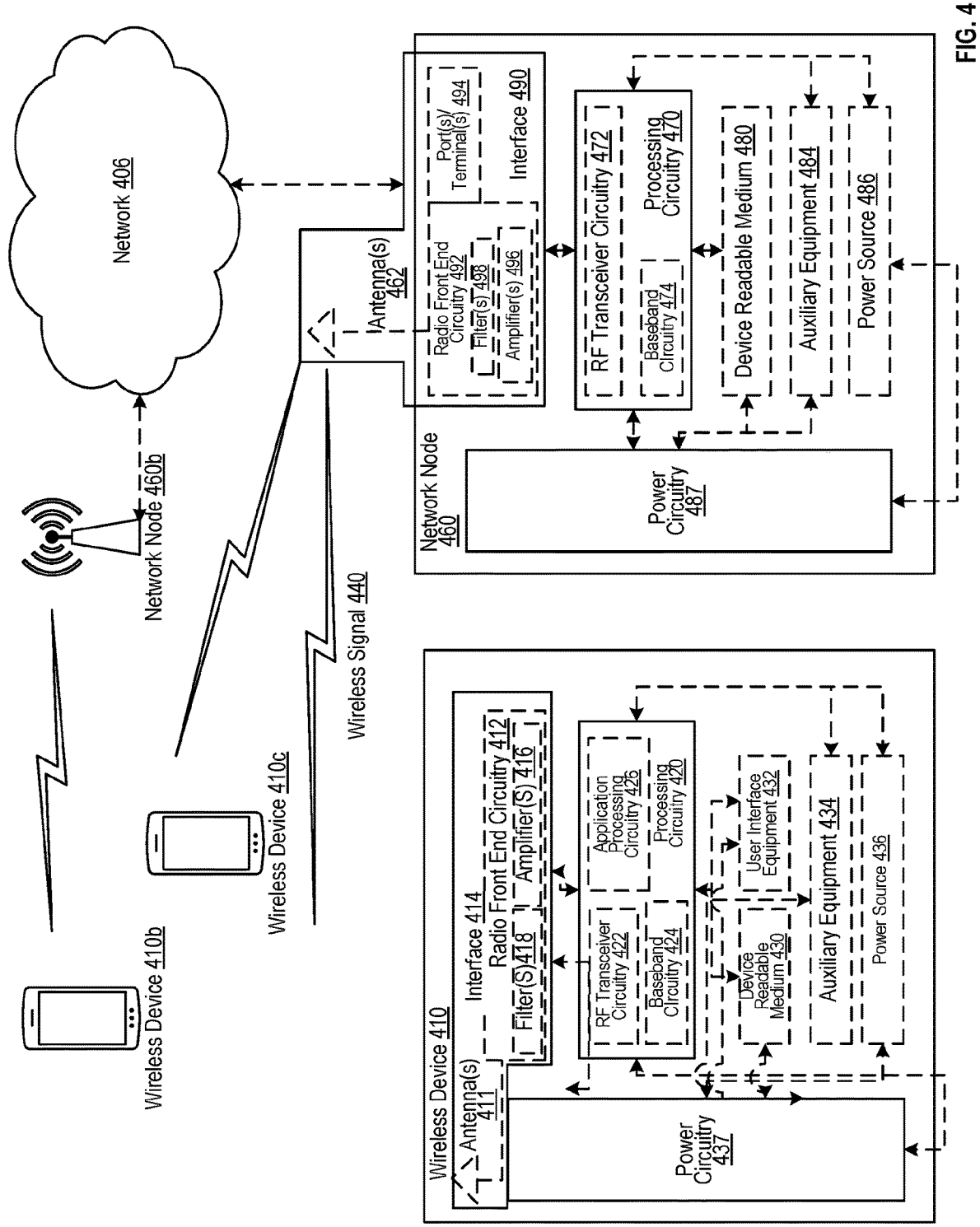
FIG. 4 illustrates a wireless network in accordance with some embodiments.

FIG. 4: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460b, and WDs 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 484, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units.

In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signaling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, Wi-Fi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 5:
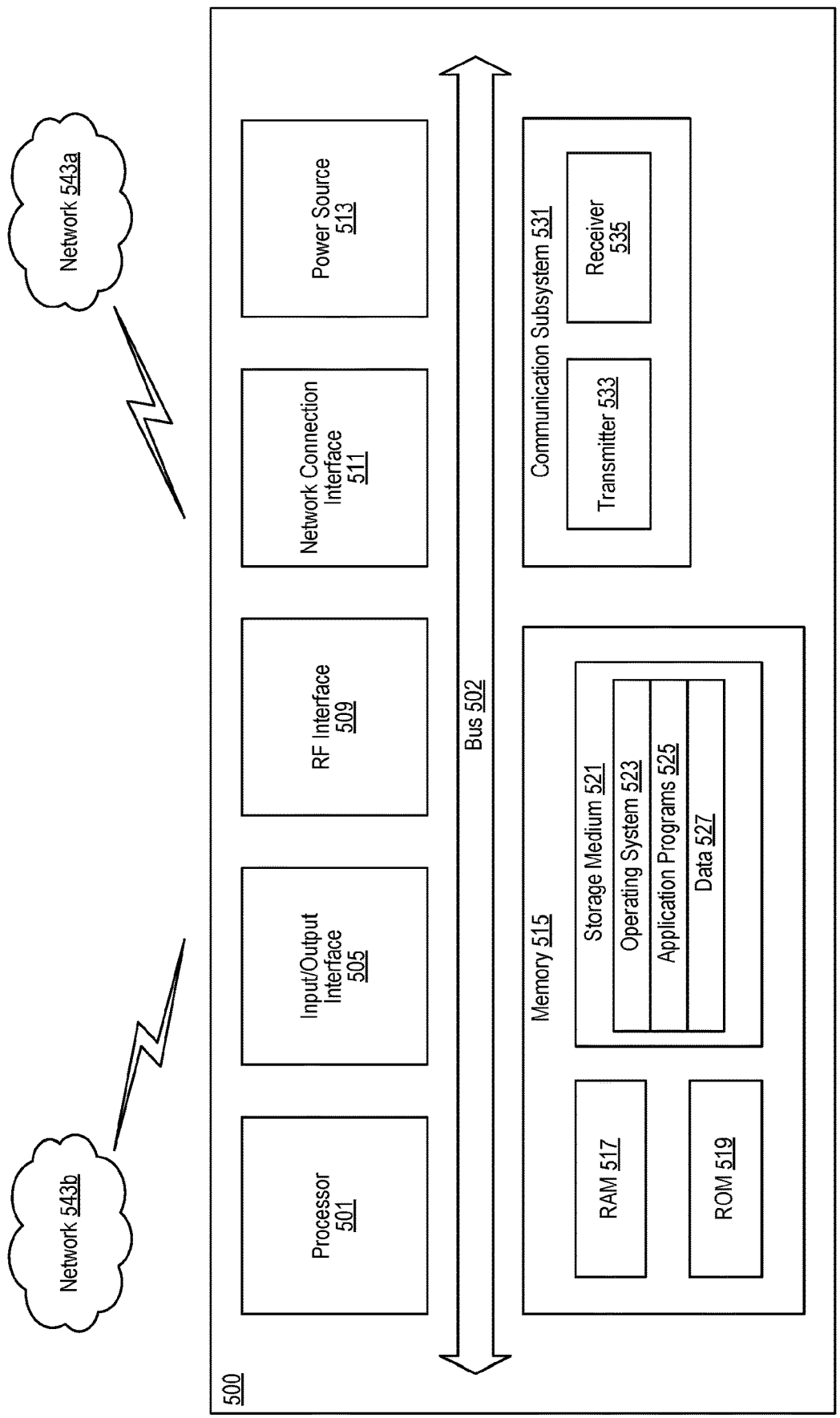
FIG. 5 illustrates User Equipment in accordance with some embodiments.

FIG. 5: User Equipment in Accordance with Some Embodiments

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 5200 may be any UE identified by the 3' Generation Partnership Project (3GPP), including a NB-IoT UE, a machine type communication (MTC) UE, and/or an enhanced MTC (eMTC) UE. UE 500, as illustrated in FIG. 5, is one example of a WD configured for communication in accordance with one or more communication standards promulgated by the 3' Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543b using communication subsystem 531. Network 543a and network 543b may be the same network or networks or different network or networks. Communication subsystem 531 may be configured to include one or more transceivers used to communicate with network 543b. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543b may encompass wired and/or wireless networks such as a local-area network (LAN), a wide-area network (WAN), a computer network, a wireless network, a telecommunications network, another like network or any combination thereof. For example, network 543b may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
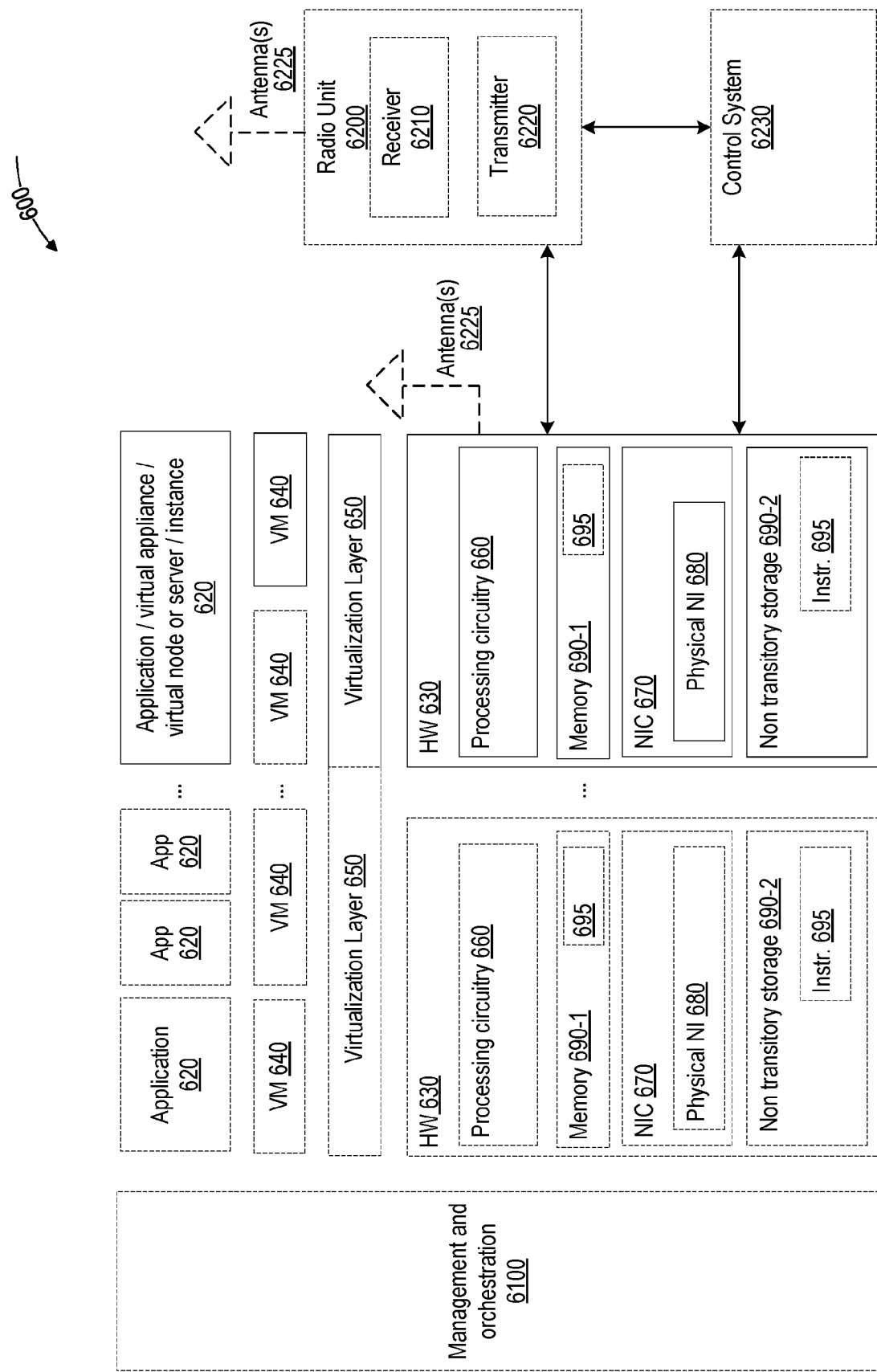
FIG. 6 illustrates virtualization environment in accordance with some embodiments.

FIG. 6: Virtualization Environment in Accordance with Some Embodiments

FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signaling can be effected with the use of control system 6230 which may alternatively be used for communication between the hardware nodes 630 and radio units 6200.

Figure 7:
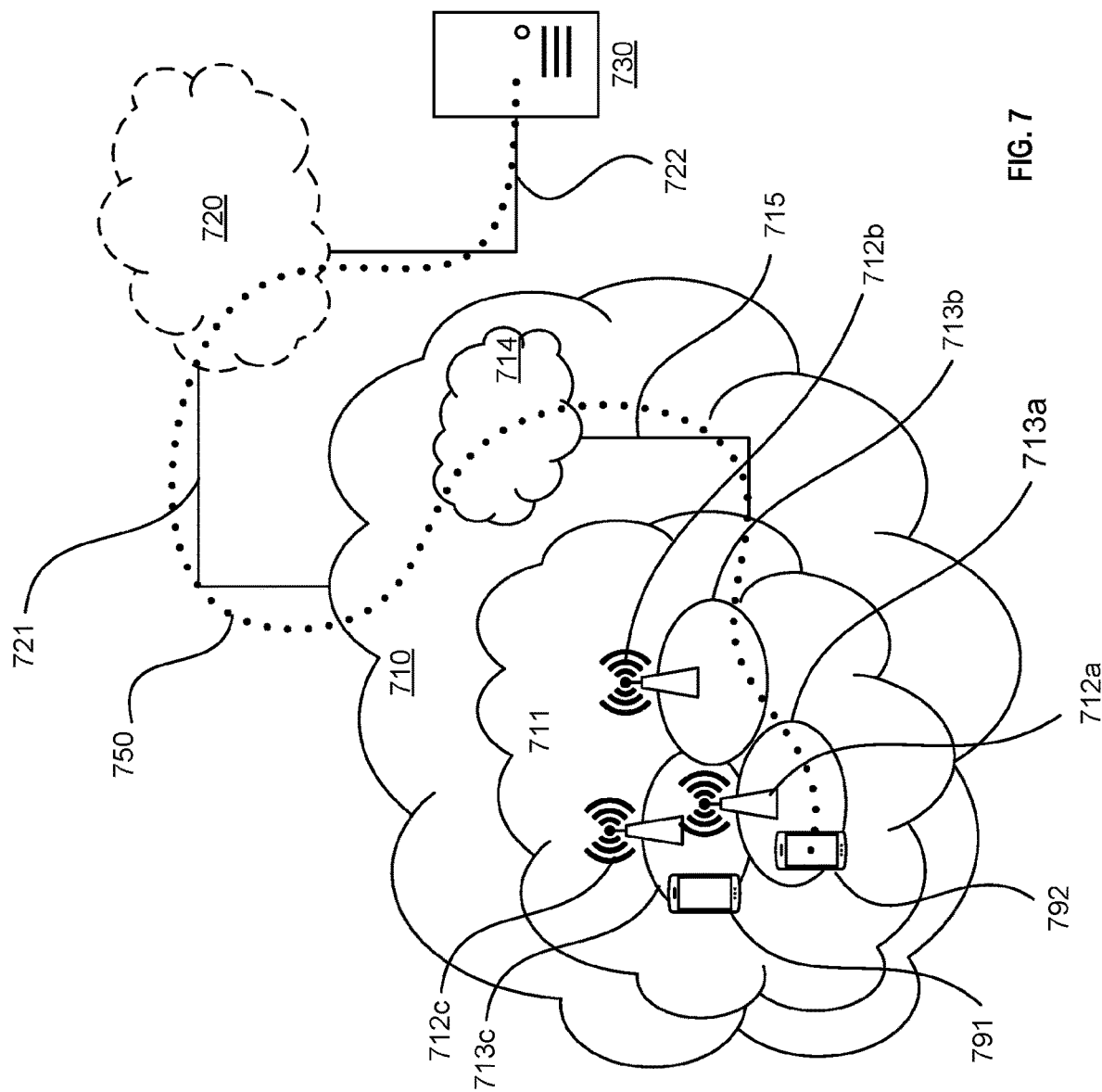
FIG. 7 illustrates telecommunication network connected via an intermediate network to a host computer in accordance with some embodiments.

FIG. 7: Telecommunication network connected via an intermediate network to a host computer in accordance with some embodiments With reference to FIG. 7, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more sub-networks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 8:
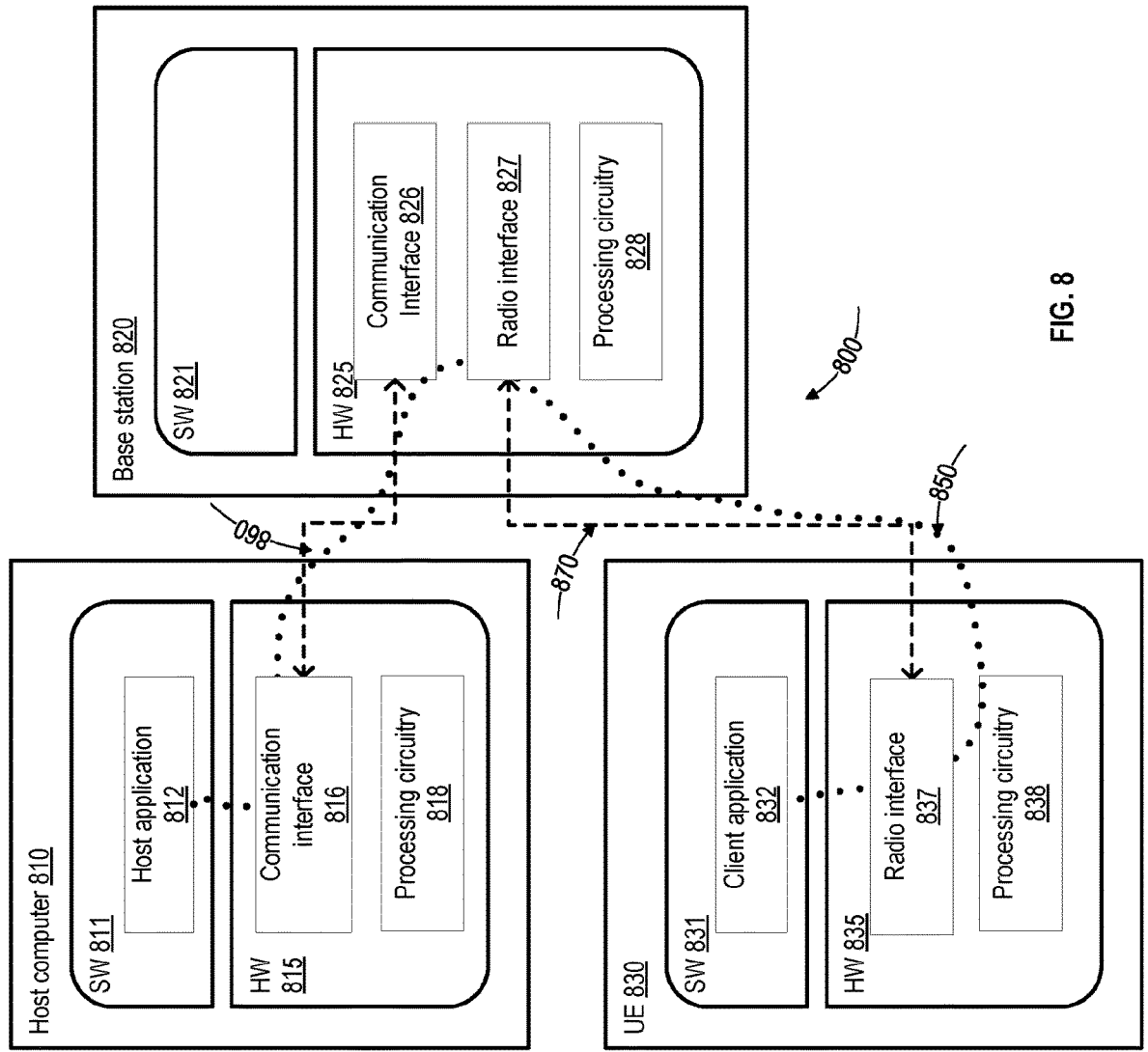
FIG. 8 illustrates host computer communicating via a base station with a user equipment over a partially wireless connection in accordance with some embodiments.

FIG. 8: Host Computer Communicating Via a Base Station with a User Equipment Over a Partially Wireless Connection in Accordance with Some Embodiments Example implementations, in accordance with an embodiment, of the UE, base station and host computer discussed in the preceding paragraphs will now be described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 8 may be similar or identical to host computer 730, one of base stations 712*a*, 712*b*, 712*c* and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout the present disclosure. One or more of the various embodiments improve the performance of OTT services provided to UE 830 using OTT connection 850, in which wireless connection 870 forms the last segment. More precisely, the teachings of these embodiments may improve the power consumption by the UE and thereby provide benefits such as an extended battery lifetime of the UE, and more efficient downlink monitoring by the UE.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810'*s* measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
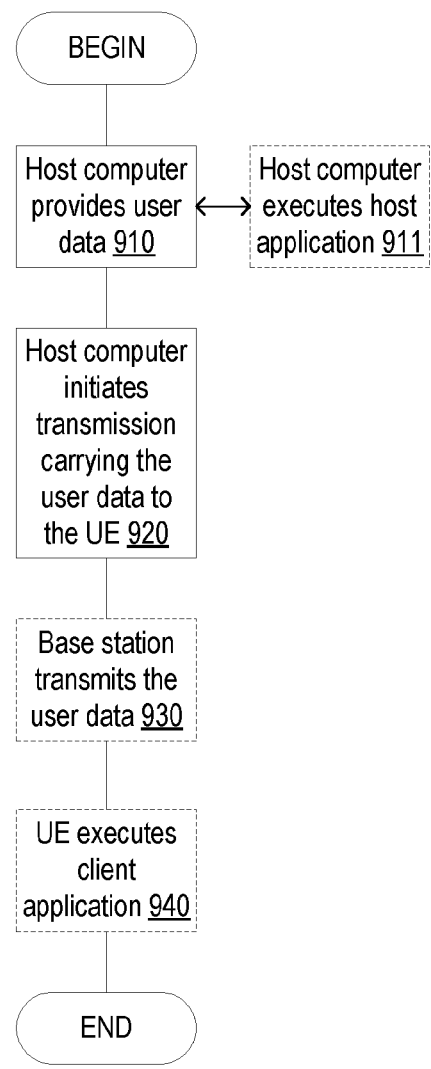
FIG. 9 illustrates methods implemented in a communication system including a host computer, a base station, and a user equipment in accordance with some embodiments.

FIG. 9: Methods Implemented in a Communication System Including a Host Computer, a Base Station and a User Equipment in Accordance with Some Embodiments FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
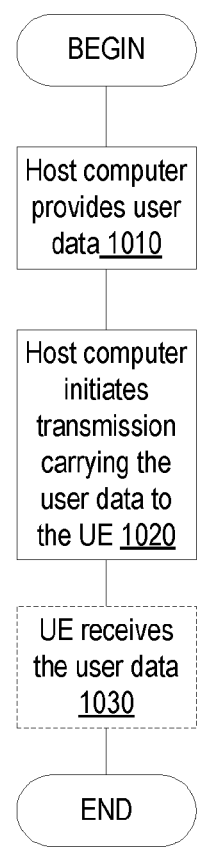
FIG. 10 illustrates methods implemented in a communication system including a host computer, a base station, and a user equipment in accordance with some embodiments.

FIG. 10: Methods Implemented in a Communication System Including a Host Computer, a Base Station and a User Equipment in Accordance with Some Embodiments FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
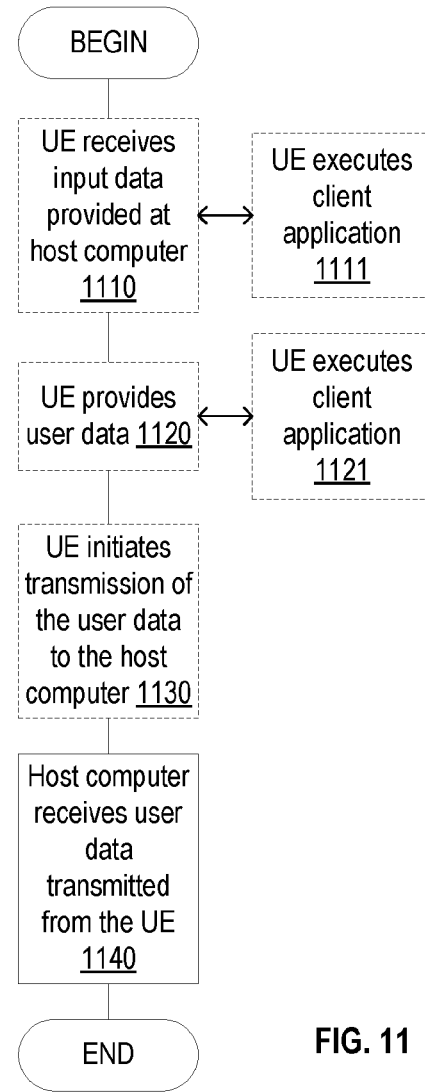
FIG. 11 illustrates methods implemented in a communication system including a host computer, a base station, and a user equipment in accordance with some embodiments.

FIG. 11: Methods Implemented in a Communication System Including a Host Computer, a Base Station and a User Equipment in Accordance with Some Embodiments FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
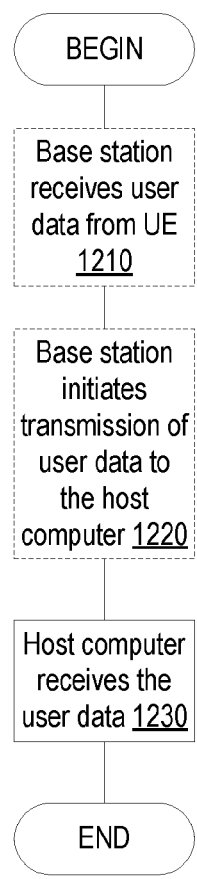
FIG. 12 illustrates methods implemented in a communication system including a host computer, a base station, and a user equipment in accordance with some embodiments.

FIG. 12: Methods Implemented in a Communication System Including a Host Computer, a Base Station and a User Equipment in Accordance with Some Embodiments FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 13:
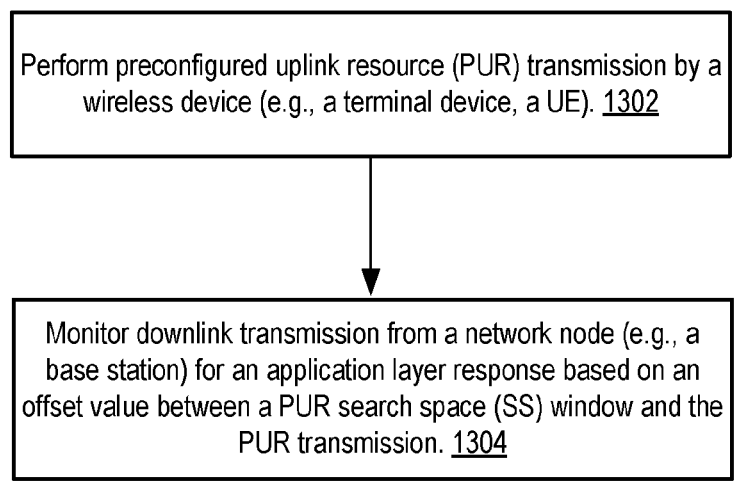
FIG. 13 illustrates a method in accordance with some embodiments at a wireless device.

FIG. 13: Method in Accordance with Some Embodiments at a Wireless Device

FIG. 13 depicts a method in accordance with particular embodiments, the method begins at step 1302 with performing pre-configured uplink resource (PUR) transmission by a wireless device (e.g., a terminal device, a UE), and continues at step 1304 with monitoring downlink transmission from a network node (e.g., a base station) for an application layer response based on an offset value between a PUR search space (SS) window and the PUR transmission.

In some embodiments, the offset value is between a beginning of the PUR SS window and the beginning or end of the PUR transmission. In some embodiments, the offset value is configured and transmitted by the network node. In some embodiments, the office value is determined based on an expected application layer response delay.

In some embodiments, the offset value is based on a PUR configuration request sent/transmitted from the terminal device to the network node.

In some embodiments, the terminal device is in one of an idle and connected mode.

In some embodiments, the terminal device monitors one of a MPDCCH and a NPDCCH.

In some embodiments, monitoring the downlink transmission comprises waking up the wireless device after the offset value expires following the PUR transmission to monitor for the application layer response.

In some embodiments, the application layer response is one of a L1 or L2/3 PUR acknowledgement.

In some embodiments, discontinuous reception (DRX) is applied within the PUR SS window.

Figure 14:
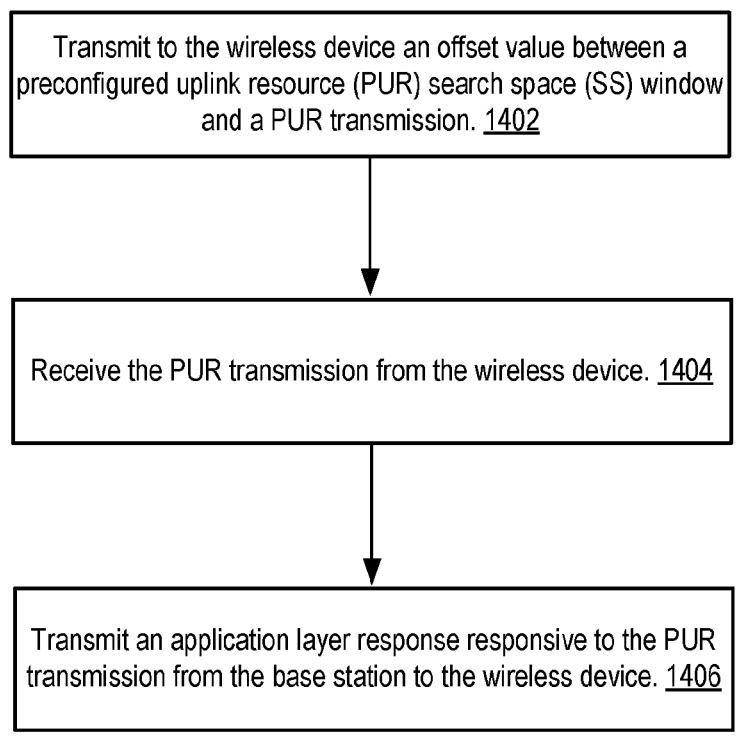
FIG. 14 illustrates a method in accordance with some embodiments at a network node (e.g., base station).

FIG. 14: Method in Accordance with Some Embodiments at a Network Node (e.g., Base Station)

FIG. 14 depicts a method in accordance with particular embodiments, the method begins at step 1402 with transmitting to the wireless device an offset value between a pre-configured uplink resource (PUR) search space (SS) window and a PUR transmission, continues at step 1404 with receiving the PUR transmission from the wireless device, and further continues at step 1406 with transmitting an application layer response responsive to the PUR transmission from the base station to the wireless device.

In some embodiments, the base station receives a PUR configuration request, and wherein the base station determines the offset value based on the PUR configuration request.

Figure 15:
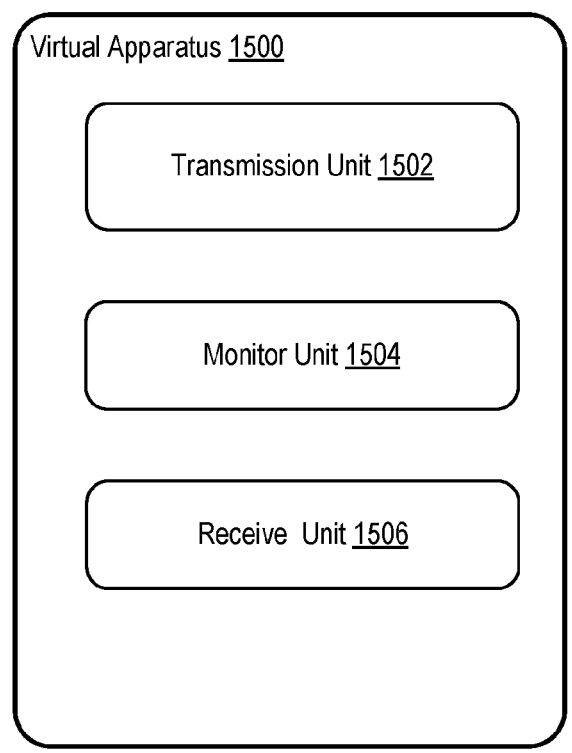
FIG. 15 illustrates virtualization apparatus in accordance with some embodiments.

FIG. 15: Virtualization apparatus in accordance with some embodiments

FIG. 15 illustrates a schematic block diagram of an apparatus 1500 in a wireless network (for example, the wireless network shown in FIG. 4). The apparatus may be implemented in a wireless device or network node (e.g., wireless device 410 or network node 460 shown in FIG. 4). Apparatus 1500 is operable to carry out the example method described with reference to FIGS. 13, 14, and possibly any other processes or methods disclosed herein. It is also to be understood that the methods of FIGS. 13 and 14 are not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmission unit 1502, monitor unit 1504, and receive unit 1506 and any other suitable units of apparatus 1500 to perform corresponding functions according one or more embodiments of the present disclosure.

As illustrated in FIG. 15, apparatus 1500 includes transmission unit 1502, monitor unit 1504. In some embodiments, the transmission unit 1502 is configured to perform pre-configured uplink resource (PUR) transmission, and the monitor unit 1504 is configured to monitor downlink transmission from a network node (e.g., a base station) for an application layer response based on an offset value between a PUR search space (SS) window and the PUR transmission.

In some embodiments, the transmission unit 1502 is configured to transmit to a the wireless device an offset value between a pre-configured uplink resource (PUR) search space (SS) window and a PUR transmission, the receive unit 1506 is configured to receive the PUR transmission from the wireless device, and the transmission unit 1502 is further configured to transmit an application layer response responsive to the PUR transmission from the base station to the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Embodiments

Group A Embodiments

1. A method performed by a wireless device for efficient energy consumption, the method comprising:
   performing pre-configured uplink resource (PUR) transmission by a wireless device (e.g., a terminal device, a UE); and
   monitoring downlink transmission from a network node (e.g., a base station) for an application layer response based on an offset value between a PUR search space (SS) window and the PUR transmission.

2. The method of embodiment, 1, wherein the offset value is between a beginning of the PUR SS window and the beginning or end of the PUR transmission.

3. The method of embodiment 1, wherein the offset value is configured and transmitted by the network node.

4. The method of embodiment 1, wherein the offset value is determined based on an expected application layer response delay.

5. The method of embodiment 1, wherein the offset value is based on a PUR configuration request transmitted from the terminal device to the network node.

6. The method of embodiment 1, wherein the terminal device is in one of an idle or connected mode.

7. The method of embodiment 1, wherein the terminal device monitors one of a MPDCCH and a NPDCCH.

8. The method of embodiment 1, wherein monitoring the downlink transmission comprises: waking up the wireless device after the offset value expires following the PUR transmission; and monitoring for the application layer response.

9. The method of embodiment 1, wherein the application layer response is one of a L1 or L2/3 PUR acknowledgement.

10. The method of embodiment 1, wherein discontinuous reception (DRX) is applied within the PUR SS window.

Group B Embodiments

11. A method performed by a base station for efficient energy consumption by a wireless device, the method comprising:
   transmitting to the wireless device an offset value between a pre-configured uplink resource (PUR) search space (SS) window and a PUR transmission;
   receiving the PUR transmission from the wireless device; and
   transmitting an application layer response responsive to the PUR transmission from the base station to the wireless device.

12. The method of embodiment 11, wherein the base station receives a PUR configuration request, and wherein the base station determines the offset value based on the PUR configuration request.

13. The method of any of the previous embodiments, further comprising:
   obtaining user data; and
   forwarding the user data to a host computer or a wireless device.

Group C Embodiments

14. A wireless device for efficient energy consumption, the wireless device comprising:
   processing circuitry configured to perform any of the steps of any of the Group A embodiments; and
   power supply circuitry configured to supply power to the wireless device.

15. A base station for efficient energy consumption by a wireless device, the base station comprising:
   processing circuitry configured to perform any of the steps of any of the Group B embodiments;
   power supply circuitry configured to supply power to the wireless device.

16. A user equipment (UE) for efficient energy consumption, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

17. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.

18. The communication system of the previous embodiment further including the base station.

19. The communication system of the previous 2 embodiments, further including the UE, wherein the UE is configured to communicate with the base station.

20. The communication system of the previous 3 embodiments, wherein:
the processing circuitry of the host computer is configured to execute a host application, thereby providing the user data; and
the UE comprises processing circuitry configured to execute a client application associated with the host application.

21. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

22. The method of the previous embodiment, further comprising, at the base station, transmitting the user data.

23. The method of the previous 2 embodiments, wherein the user data is provided at the host computer by executing a host application, the method further comprising, at the UE, executing a client application associated with the host application.

24. A user equipment (UE) configured to communicate with a base station, the UE comprising a radio interface and processing circuitry configured to performs the of the previous 3 embodiments.

25. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

26. The communication system of the previous embodiment, wherein the cellular network further includes a base station configured to communicate with the UE.

27. The communication system of the previous 2 embodiments, wherein:
the processing circuitry of the host computer is configured to execute a host application, thereby providing the user data; and
the UE's processing circuitry is configured to execute a client application associated with the host application.

28. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

29. The method of the previous embodiment, further comprising at the UE, receiving the user data from the base station.

30. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

31. The communication system of the previous embodiment, further including the UE.

32. The communication system of the previous 2 embodiments, further including the base station, wherein the base station comprises a radio interface configured to communicate with the UE and a communication interface configured to forward to the host computer the user data carried by a transmission from the UE to the base station.

33. The communication system of the previous 3 embodiments, wherein:
the processing circuitry of the host computer is configured to execute a host application; and
the UE's processing circuitry is configured to execute a client application associated with the host application, thereby providing the user data.

34. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

35. A method implemented in a communication system including a host computer, a base station and a user equipment (UE), the method comprising:
at the host computer, receiving user data transmitted to the base station from the UE, wherein the UE performs any of the steps of any of the Group A embodiments.

36. The method of the previous embodiment, further comprising, at the UE, providing the user data to the base station.

37. The method of the previous 2 embodiments, further comprising:
at the UE, executing a client application, thereby providing the user data to be transmitted; and
at the host computer, executing a host application associated with the client application.

38. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

39. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

40. The communication system of the previous embodiment further including the base station.

41. The communication system of the previous 2 embodiments, further including the UE, wherein the UE is configured to communicate with the base station.

42. The communication system of the previous 3 embodiments, wherein:
the processing circuitry of the host computer is configured to execute a host application;
the UE is configured to execute a client application associated with the host application, thereby providing the user data to be received by the host computer.

43. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

44. The method of the previous embodiment, further comprising at the base station, receiving the user data from the UE.

45. The method of the previous 2 embodiments, further comprising at the base station, initiating a transmission of the received user data to the host computer.

What is claimed is:

1. A method implemented in a wireless device for efficient energy consumption, the method comprising:
performing an uplink transmission on pre-configured resources to a network node; and
monitoring in a search space (SS) window for an application layer response from a network node downlink transmission based on an offset value indicating a time difference between the SS window and the uplink transmission on the pre-configured resources, wherein the offset value is determined based on an expected application layer response delay for the uplink transmission or an observed traffic pattern at the wireless device.

2. The method of claim 1, further comprising:
transmitting an uplink configuration request message that indicates a request for the offset value from the network node.

3. The method of claim 2, wherein the offset value is transmitted by the network node in an uplink configuration message.

4. The method of claim 1, wherein the offset value indicates a duration between a beginning of the SS window and the beginning or end of the uplink transmission.

5. The method of claim 1, wherein the wireless device is to identify a layer 1 acknowledgment of the uplink transmission in the SS window.

6. The method of claim 1, wherein the application layer response is sent together with a radio resource control (RRC) message that includes a Layer 2 or Layer 3 acknowledgement in a same physical layer transmission from the network node to the wireless device.

7. The method of claim 1, wherein the wireless device monitors one of a machine-type communication (MTC) physical downlink control channel (MPDCCH) or a narrow band physical downlink control channel (NPDCCH) that schedules a MTC physical downlink shared channel (MPDSCH) or a narrow band physical downlink shared channel (NPDSCH) that includes the application layer response.

8. The method of claim 1, wherein the wireless device performs discontinuous reception (DRX) for a duration indicated by the offset value.

9. The method of claim 1, wherein the uplink transmission on the pre-configured resources comprises a pre-configured uplink resource (PUR) transmission.

10. A method implemented in a network node for efficient energy consumption by a wireless device, the method comprising:
transmitting to the wireless device an offset value indicating a time difference between an uplink transmission on pre-configured resources and a search space (SS) window;
receiving the uplink transmission from the wireless device; and
transmitting an application layer response from the network node to the wireless device responsive to the uplink transmission, wherein the offset value is determined based on an expected application layer response delay for the uplink transmission or observed traffic pattern at the wireless device.

11. The method of claim 10, further comprising:
receiving, from the wireless device, an uplink configuration request that indicates a request for the offset value.

12. The method of claim 10, wherein the application layer response is sent together with a radio resource control (RRC) message that includes a Layer 2 or Layer 3 acknowledgement in a same physical layer transmission from the network node to the wireless device.

13. The method of claim 10, wherein the uplink transmission on pre-configured resources comprises a pre-configured uplink resource (PUR) transmission.

14. A network node to conserve energy consumption of a wireless device coupled to the network node, the network node comprising:
processing circuitry and device readable medium coupled to the processing circuitry, wherein the device readable medium stores instructions, which when executed, are capable of causing the network node to perform operations of:
transmitting to the wireless device an offset value indicating a time difference between an uplink transmission on pre-configured resources and a search space (SS) window;
receiving the uplink transmission from the wireless device; and
transmitting an application layer response from the network node to the wireless device responsive to the uplink transmission, wherein the offset value is determined based on an expected application layer response delay for the uplink transmission or observed traffic pattern at the wireless device.

15. The network node of claim 14, wherein the network node is caused to further perform operations of:
receiving, from the wireless device, an uplink configuration request that indicates a request for the offset value.

16. The network node of claim 14, wherein the application layer response is sent together with a radio resource control (RRC) message that includes a Layer 2 or Layer 3 acknowledgement in a same physical layer transmission from the network node to the wireless device.

* * * * *